(No Model.)  3 Sheets—Sheet 1.
F. T. FREELAND.
JIGGER FOR SEPARATING ORES.
No. 356,359. Patented Jan. 18, 1887.
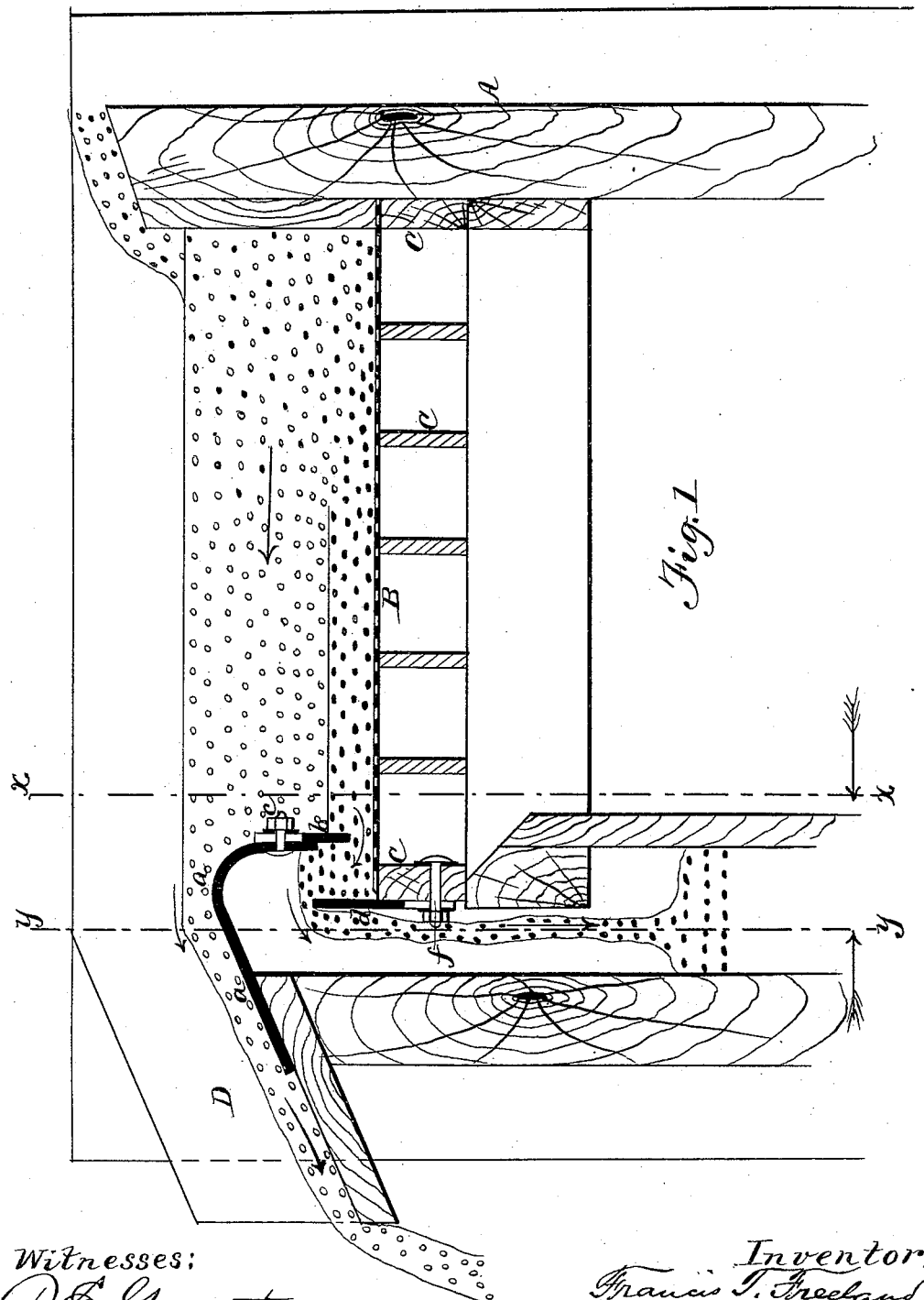
Witnesses:
Inventor:
Francis T. Freeland
by Johnson & Johnson
Attys

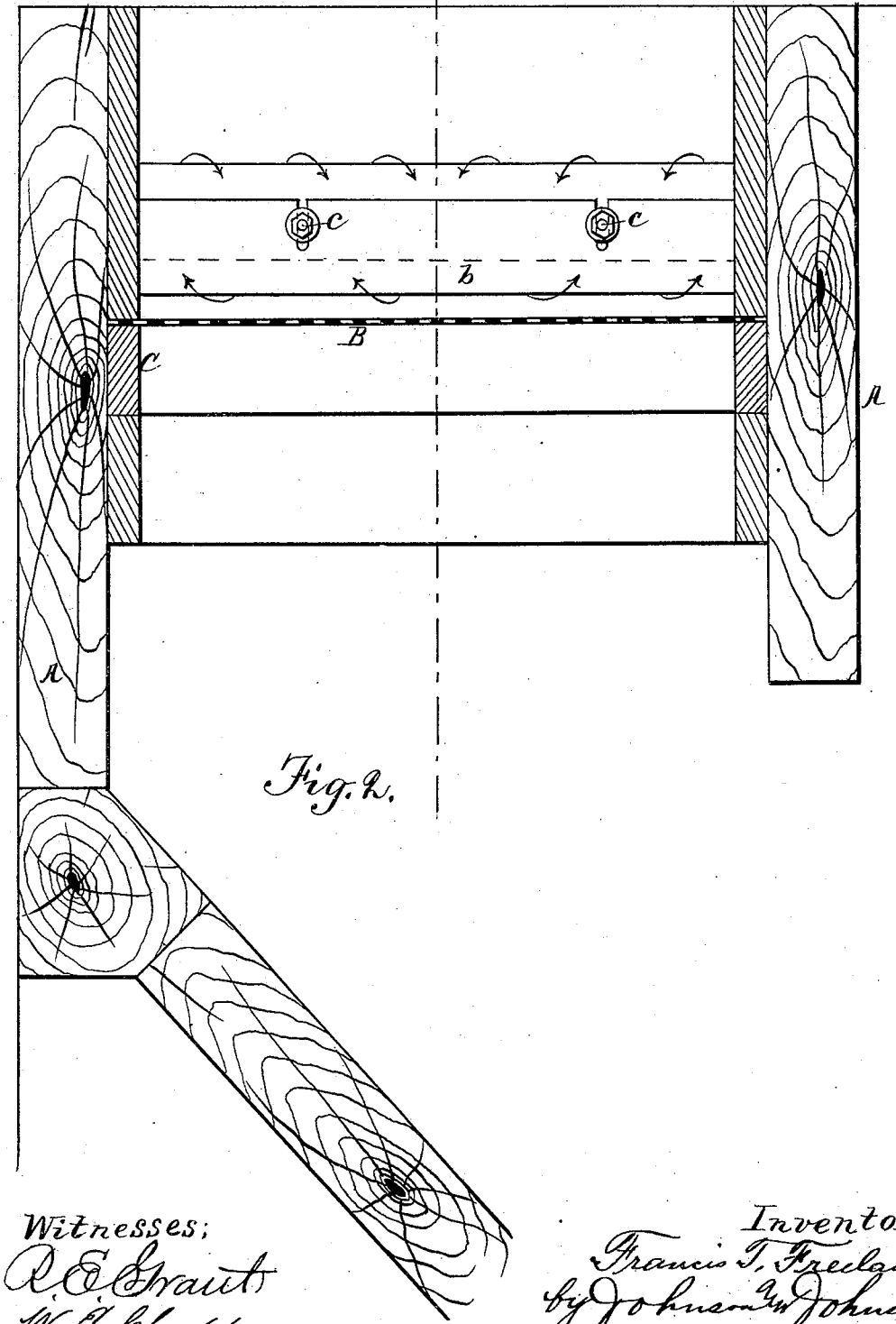

(No Model.)  3 Sheets—Sheet 3.
F. T. FREELAND.
JIGGER FOR SEPARATING ORES.
No. 356,359. Patented Jan. 18, 1887.
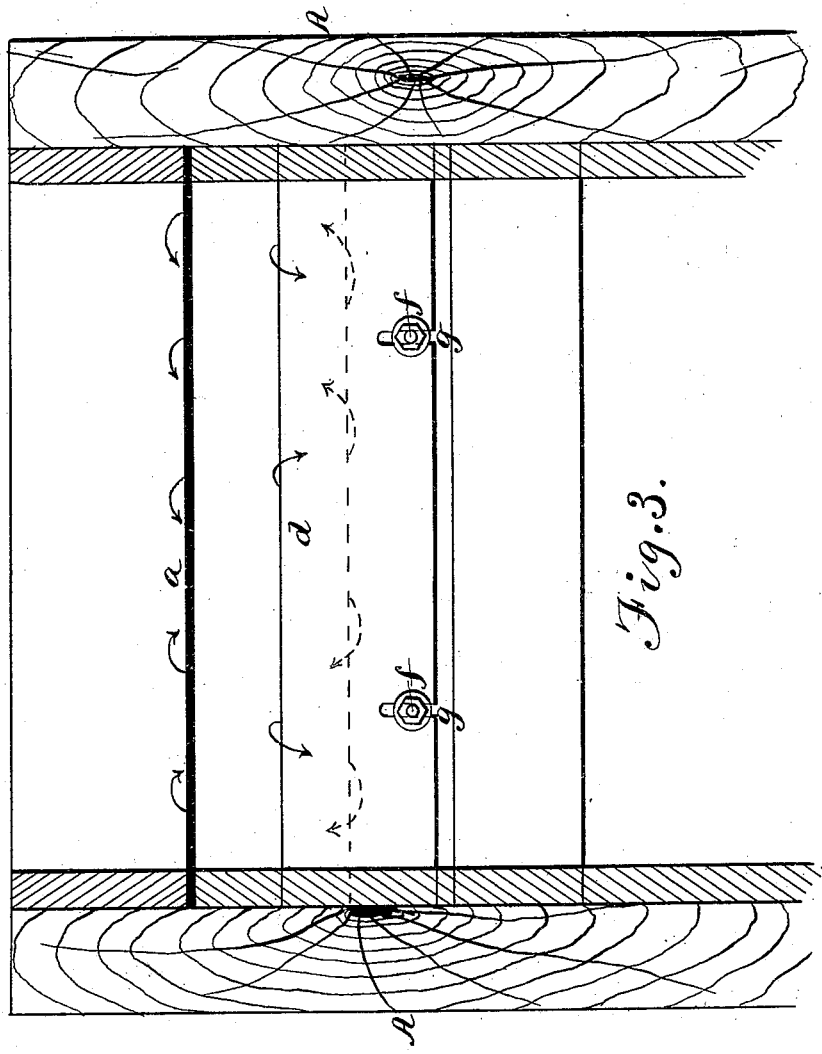
Witnesses:
D. E. Grant
W. C. Chaffer
Inventor:
Francis T. Freeland
by Johnson and Johnson
Attys.

UNITED STATES PATENT OFFICE.

FRANCIS T. FREELAND, OF LEADVILLE, COLORADO.

JIGGER FOR SEPARATING ORES.

SPECIFICATION forming part of Letters Patent No. 356,359, dated January 18, 1887.

Application filed April 26, 1886. Serial No. 200,124. (No model.)

*To all whom it may concern:*

Be it known that I, FRANCIS T. FREELAND, a citizen of the United States, residing at Leadville, in the county of Lake and State of Colorado, have invented new and useful Improvements in Jiggers for Separating Ores, of which the following is a specification.

My invention relates to jiggers for concentrating and separating ores and similar substances of that class in which the matrix or substance to be separated is fed onto a perforated bottom and agitated by the pulsating movement of a body of water which separates the substance into strata corresponding with the different specific gravity of each. In case the substance be ore, the latter will occupy the lower strata, and the waste or gangue will occupy the higher strata. As the line of demarkation varies for different substances, and according to the difference in gravities of materials of the same kind, it has been found expedient to provide an adjustable discharge to determine the points of continuous delivery, and to have the point of discharge of the heavier substance at a higher level than the line of demarkation, so that the difference in height between the two levels will equal the height of the waste or lighter substance above the line of demarkation when reduced to an equivalent weight of the ore or heavier substance comprised within said difference.

For carrying out the above-stated operations I have improved the jigger in the provision of two co-operating lips, one carried by the fixed curved dam and the other arranged beneath said dam and carried at the front end of the box having the perforated bottom, both of said dams being adjustable in relation to each other, to the fixed dam, and to the perforated bottom of the box, as more fully hereinafter described, claimed, and illustrated in the drawings, in which—

Figure 1 is a longitudinal sectional view of a jigger of my construction provided with my improvements. Fig. 2 is a cross-section on the line $x\,x$ of Fig. 1. Fig. 3 is a sectional view on the line $y\,y$ of Fig. 1.

The jig-box A may be of any approved construction; but that shown is preferred, as it forms the subject-matter of a patent granted to me August 31, 1886, and numbered 348,517. The perforated bed or sieve B is supported upon a suitable frame, C, within the jig-box. A fixed dam, $a$, secured directly over the discharge end of the bed, communicates with a chute, D, leading from and forming the discharge of the box. A lip, $b$, depending from the lower edge of the dam, is adjustably secured thereto by bolts $c$, passing through slots in the upper portion of the lip in such manner that no openings are disclosed for the waste to find its way into the ore-compartment. A lip, $d$, projecting upward from the discharge end of the bed, is adjustably secured thereto by bolts $f$, passing through slots $g$, so as not to leave any openings when adjusting the lip. The lip $b$ is located at a distance from or in rear of the lip $d$, for the purpose presently made known.

In practice the material or substance to be separated is fed to the bed at the right-hand side, or that portion opposite the discharge end, as shown in Fig. 1, and as it moves along the bed from right to left it is subjected to the sorting action of the water, which, overcoming the inertia of the particles, causes the heavier ones to gravitate and the lighter ones to rise till a well-defined line of separation appears between the two substances, the lighter of which works over the dam $a$, the heavier beneath the lip $b$, and over the lip $d$, into a separate compartment of the jig-box, from which it is removed at intervals.

The dam and lips extend clear across the bed and do not obstruct the flow of the material in any way, or occupy any portion of the sieve. The lip on the dam is adjusted to a height above the sieve or bed corresponding with the material being worked on the bed, so as to draw the concentrates from the bottom. The lip on the end of the screen is adjusted so that the excess of the height of the concentrated substance beneath the dam over that on the bed will equal that of the waste on the bed above the concentrates when reduced to an equivalent weight of mineral.

The lighter stuff or gangue is referred to as "waste" and the heavier as "ore;" but the reverse may be the case, the lighter being the more valuable and the heavier the waste, as in coal separating and dressing.

The fixed dam $a$ is preferably formed with a curve at the overflow-point, so that the part carrying the lip $b$ will stand vertical, and the part carrying off the waste will stand inclining downward in the chute directly over and above the bed-lip $d$, which is preferably set against the outer end of the frame C. The lip $b$ is placed upon the inner side of the dam for convenience of adjustment.

It will be understood that the piston for giving a jigging motion to the water occupies a compartment immediately adjoining the ore-bed compartment and communicates with it.

I claim—

In a jigger of the herein-described type, the combination of the box having a perforated bottom, the fixed curved dam $a$, provided with a lip, $b$, extending downward from the inner lower edge, and a lip, $d$, extending upward from the discharge end of the box and beneath said curved dam, the said lips being vertically adjustable in relation to each other, to the dam, and to the perforated bottom, and separated, as shown, and for the purposes specified.

In testimony whereof I have hereunto set my hand in the presence of two subscribing witnesses.

FRANCIS T. FREELAND.

Witnesses:
WM. H. KELLER,
LOUIS SPENCER NOBLE.